Oct. 23, 1945.  M. W. HUMPHREYS  2,387,586
TOASTING DEVICE
Filed Oct. 10, 1942  2 Sheets-Sheet 1
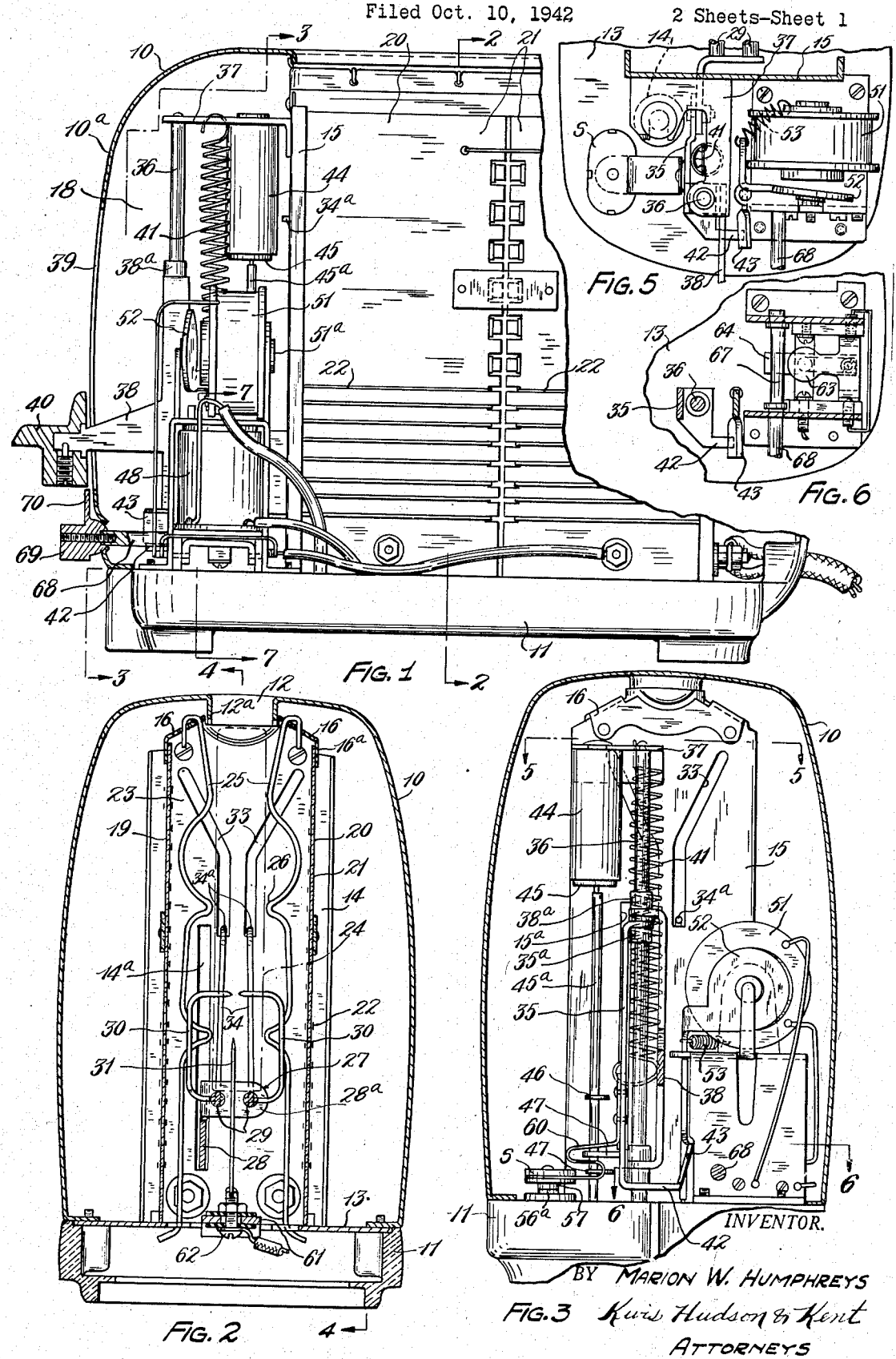
INVENTOR.
BY MARION W. HUMPHREYS
Kwis Hudson & Kent
ATTORNEYS

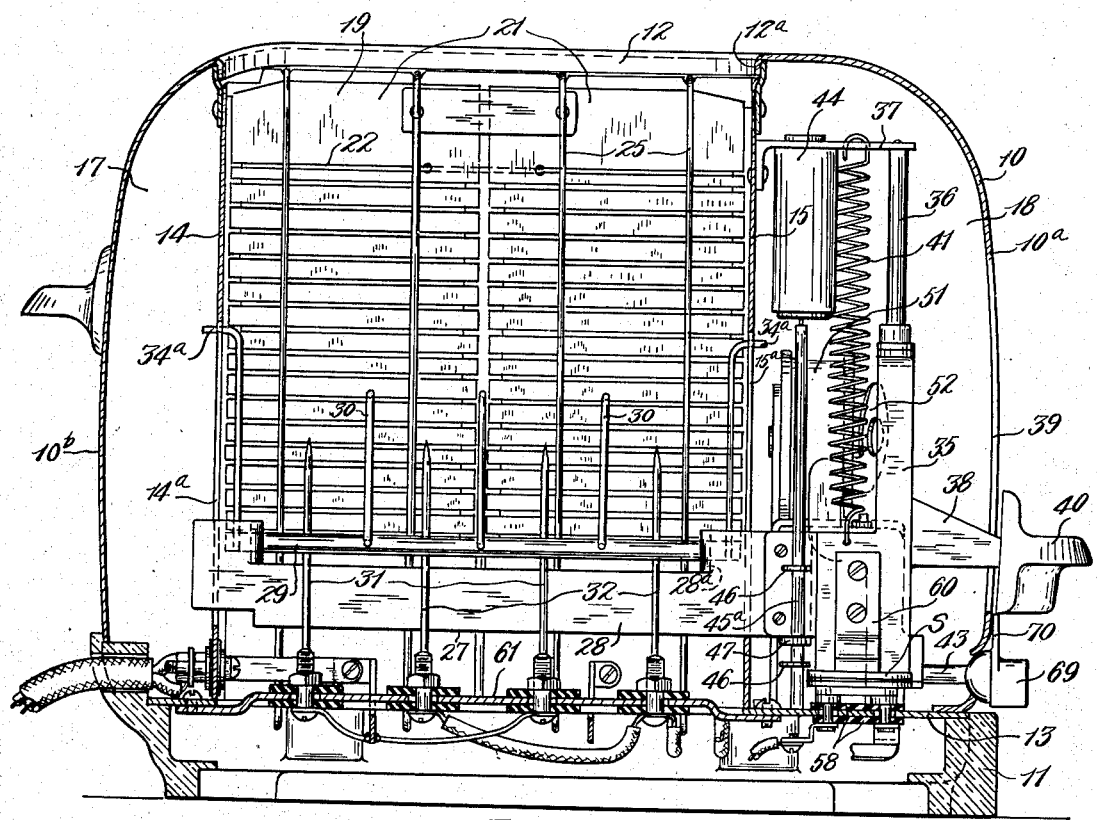

Patented Oct. 23, 1945

2,387,586

UNITED STATES PATENT OFFICE 2,387,586

TOASTING DEVICE

Marion W. Humphreys, Euclid, Ohio

Application October 10, 1942, Serial No. 461,539

3 Claims. (Cl. 99—326)

This invention relates to the toasting of bread or the like and aims to provide a novel apparatus by which an automatic toasting operation can be carried out more satisfactorily than heretofore.

Another object of the invention is to provide for the toasting of a bread slice or the like so that a change in the moisture content or in the electrical conductivity of the slice can be used to automatically control the toasting operation.

A further object of my invention is to provide an improved toasting device in which a relay circuit responsive to change in the moisture content or electrical conductivity of the slice being toasted controls the automatic operation of the device.

Still another object of the invention is to provide an improved toasting device of the character mentioned embodying means for positively moving a bread slice or the like into toasting position so as to span conducting elements included in the control circuit.

My invention also aims to provide an improved toasting device in which an adjustment of the toasting period can be effected by movement of a pointer with reference to a color chart having different toast shades thereon.

Other objects and advantages of the invention will be apparent from the following description when taken in conjunction with the accompanying sheets of drawings in which:

Fig. 1 is a partial longitudinal sectional view taken through a toasting device embodying my invention;

Fig. 2 is a transverse sectional view taken on line 2—2 of Fig. 1;

Fig. 3 is a transverse sectional view on line 3—3 of Fig. 1;

Fig. 4 is a longitudinal sectional view taken on line 4—4 of Fig. 2;

Fig. 5 is a partial sectional plan view taken as indicated by line 5—5 of Fig. 3;

Fig. 6 is a partial sectional plan view on line 6—6 of Fig. 3;

Fig. 7 is a partial vertical sectional view taken on line 7—7 of Fig. 1 and showing the relay on a larger scale;

Fig. 8 is a partial end elevation showing the color chart and adjusting pointer; and Fig. 9 is a wiring diagram.

As shown in the drawings, my improved toaster may be of the type having an outer housing or shell 10 mounted on a suitable base 11 of insulating material and provided at its top with a slot 12, defined by an inturned flange 12a, adapted to receive a slice of bread or other body to be toasted. The housing may also include a laterally extending floor plate 13 located at the point of connection of the shell with the base. A pair of spaced upright frame members 14 and 15 are connected with the floor plate and extend upwardly to meet the top of the housing 10 at the ends of the slot 12. The tops of the frame members 14 and 15 are connected by a longitudinal frame member 16 have a slot-like opening into which the inturned flange 12a of the housing 10 extends. As shown in Figs. 1 and 4, the end walls 10a and 10b of the housing 10 are spaced from the frame members 14 and 15, respectively, leaving the spaces 17 and 18 therebetween. The space 18 contains novel control mechanism which will be described hereinafter.

Heat for the toasting operation is supplied by a pair of substantially flat electric heating elements 19 and 20 which are arranged in spaced upright substantially parallel relation and extend between the floor plate 13 and the downturned flanges or edges 16a of the frame member 16. These flat heating elements and the frame members 14 and 15 form, respectively, the sides and ends of a toasting chamber 23 having the slot 12 leading into the top thereof. The elements 19 and 20 each comprise a pair of connected sheets 21 of mica or the like and a resistance wire or ribbon 22 suitably arranged on such sheets. The elements 19 and 20 are arranged with their lower edges resting on the floor plate 13 and with their upper edges extending inside of the depending flanges 16a of the frame member 16.

The bread slice 24 illustrated in broken lines and representing the body to be toasted is prevented from contacting the heating elements 19 and 20 by longitudinally spaced upright guide wires 25 located in the toasting chamber. The upper ends of these guide wires are connected with the frame member 16 and their lower ends extend through holes in the floor plate 13. The guide wires are arranged in opposed or paired relation and may be bent so that only the points 26 thereof engage the slice.

For moving the slice to and from a toasting position in the chamber 23, a movable carrier 27 is provided. The carrier comprises a bar 28 which extends longitudinally through the toasting chamber and has ears 28a in which a pair of rock shafts 29 are mounted. These rock shafts are provided with sets of spaced wire fingers or hook-like prongs 30 which have opening and closing movement relative to each other during the rocking of the shafts. These prongs serve as a gripping means which engages the slice 24 so that the latter will be moved positively with the carrier 27. The purpose in providing this gripping means on the carrier 27 is to cause the slice to be impaled on pairs of upstanding conducting elements or terminals 31 and 32 which extend upwardly between the rock shafts 29. The elements 31 and 32 constitute a part of the control means which will be later described in detail.

For rocking the shafts 29 of the carrier 27 to cause the prongs 30 to engage or release the slice 24, I may provide cooperating cam and follower elements. The cam elements 33 may be in the form of slots cut in the frame members 14 and 15, and the followers 34 may comprise arms or wires connected with the shafts 29 and having outwardly or axially extending end portions 34a engaging in the cam slots 33. As shown in Figs. 2 and 3, the cam slots 33 are arranged so that the upper portions thereof extend in diverging relation and the lower portions extend in substantially parallel relation. When the carrier 27 is in its upper position, the cam followers 34 cooperate with the diverging portions of the cam slots and hold the prongs 30 in separated relation so that when a slice is inserted through the slot 12, it will be received between the prongs with its lower edge resting on the parallel shafts 29. As the carrier 27 is moved downwardly, the cam followers 34 will be swung toward each other by the inclined portions of the cam slots, thus rocking the shafts 29 and moving the prongs 30 into gripping engagement with the slice. During the succeeding downward movement of the carrier 27, the prongs 30 will hold the slice, causing the same to move with the carrier and to be impaled on the pairs of conducting elements 31 and 32. The drawings show the carrier in its lowermost position of travel with the slice 24 in the toasting position and impaled on these conducting elements. When the carrier 27 moves upwardly, it pushes the slice off of the conducting elements 31 and 32, and as the cam followers 34 travel along the diverging portions of the cam slots 33, they cause the shafts 29 to be rocked in a direction to disengage the prongs 30 from the slice. By the time the upper edge of the slice emerges from the slot 12, the prongs 30 will have been withdrawn from the slice so that it can be lifted out of the device.

The carrier actuating and control means will next be described. As best seen in Fig. 4, one end of the bar 28 of the carrier 27 projects through a slot 15a of the frame member 15 and has a head 35 connected therewith which is slidably guided on a guide rod 36 by means of the spaced bearings 35a. This guide rod has its lower end connected with the floor plate 13 and its upper end mounted in a bracket 37 which is carried by the upright frame member 15. The opposite end of the bar 28 projects through a guide slot 14a provided in the frame member 14. An arm 38 projects through a slot 39 of the housing 10 and carries a suitably shaped knob or thumb rest 40. The arm 38 may be a part of the head 35, or, as in this case, may be in the form of a bracket having spaced bearings 38a which are located above the bearings of the head 35 and are also slidable on the rod 36. The carrier 27 is normally held in its upper or slice-receiving position by a tension spring 41 and is moved downwardly to the toasting position by manual pressure applied to the knob 40. The spring 41 has its upper end connected to the bracket 37 and its lower end connected to the head 35.

When the carrier 27 is moved downwardly to the toasting position, a lug 42 carried by the head 35 wipes past a movable latch or trigger 43 and is held by the latter against upward movement. When the latch 43 is swung to disengage or release the lug 42, as by the means to be presently described, the spring 41 returns or lifts the carrier 27 to its slice-receiving position. This upward or return movement of the carrier under the influence of the spring 41 may be cushioned or checked by a suitable check device such as a dash pot having its cylinder 44 mounted on the bracket 37 and its piston 45 connected with the head 35. The connection between the piston 45 and the head 35 may be a lost-motion connection formed by a pair of spaced stops 46 connected with the piston rod 45a and engageable with a lug 47 which projects from the head 35 and has an opening through which the piston rod is movable.

An important feature of my improved toasting device is the provision of automatic means for disengaging the latch 43 from the lug 42 when the toasting operation has been completed or carried out to the point desired by the operator. For effecting this automatic release of the carrier 27, I provide a relay 48 having a pair of contacts 49 and 50 and a magnet 51 which is controlled by the relay contacts. The magnet 51 has an armature 52 mounted for swinging movement relative to the magnet core 51a and which carries the movable latch 43. A tension spring 53 acting on the armature 52 normally urges the same away from the magnet core, thereby also holding the latch 43 in the path of movement of the lug 42.

Reverting to the heating elements 19 and 20, it will be seen from the drawings that current is supplied to these elements from the conductors 54 and 55 through a switch S comprising a pair of stationary contacts 56a and 56b and a movable contact 57 cooperating therewith. The stationary contacts 56a and 56b are mounted on the floor plate 13 but are insulated from this plate and from each other by insulation pieces 58. The movable contact 57 is connected with the head 35 by a flexible arm or spring 60 from which this contact is suitably insulated. When the carrier 27 is moved downwardly to the toasting position, the contact 57 is pressed against the contacts 56a and 56b to thereby connect the heating elements 19 and 20 with the current supply conductors 54 and 55. So long as the switch S remains closed, current will be supplied to the heating elements, but when the carrier 27 is retracted or moved upwardly, the switch S is opened to discontinue the toasting operation.

I have observed that during the toasting of a slice of bread or the like, moisture is driven off by the heat supplied during the toasting operation. The resulting decrease in the moisture content of the bread produces a corresponding decrease in its electrical conductivity, and this variation in the conductivity of the bread can be used for controlling the toasting operation. In utilizing this principle, I make the relay 48 a high resistance relay whose winding has a resistance on the order of 10,000 ohms and arrange the relay in a control circuit so that its energization will vary as the conductivity of the bread changes during the toasting operation. As best illustrated in the wiring diagram of Fig.

9, the control circuit includes the winding of the relay 48 and the spaced conducting elements 31 and 32. As shown in the diagram, one end of the relay winding is connected with the supply conductor 54 and the other end of the relay winding is connected with the elements 31. The other conducting elements 32 are connected with the supply conductor 55, and the control circuit is completed through the portions of the slice 24 which span the elements 31 and 32.

It can be explained best at this point that the conducting elements 31 and 32 are in the form of pointed wires or pins carried by a bar 61 which is connected to the floor plate 13. The elements 31 and 32 may be mounted on the bar 61 by means of screws 62 which are insulated from the bar and to which screws the elements 31 and 32 are soldered or otherwise connected.

The relay 48 includes a pivoted armature 63 which cooperates with the relay core 48a and which drops by gravity away from the core when the relay is deenergized or whenever the energization thereof is reduced to a predetermined point, as by a predetermined decrease in the energizing current flowing through the control circuit. The armature 63 of the relay may include an arm 64 formed of insulating material and on which the movable relay contact 49 is mounted by means of the spring finger 65. So long as the armature 63 of the relay is held up by the attraction of the core 48a, the relay contacts 49 and 50 will be maintained separated, but when the armature drops away from the core, the movable contact 49 engages the stationary contact 50, as shown in Fig. 7.

From the wiring diagram of Fig. 9, it will be seen that the relay contacts 49 and 50 control the energizing circuit for the magnet 51. When the relay contacts are open, the magnet 51 is deenergized and the latch 43 on the armature 52 will remain in engagement with the lug 42 of the carrier 27. When the relay contacts close, the magnet 51 is energized, and the resulting attraction of the armature 52 causes the latch 43 to be disengaged from the lug 42. Thus it will be seen that the energization of the magnet 51 will depend indirectly upon a predetermined change in the conductivity of the slice 24.

At the beginning of the toasting operation electric current will pass through the slice, by reason of the moisture contained therein, between the conducting elements 31 and 32, and the relay 48 will be energized and will hold the contacts 49 and 50 open. As the toasting operation progresses, the moisture is driven out of the slice and its conductivity decreases with a corresponding decrease in the energization of the relay 48. When the conductivity of the slice decreases to the point that the relay permits the contacts 49 and 50 to close, the magnet 51 will be energized and the carrier 27 will be released and will move upwardly under the influence of the spring 41, thereby opening the main switch to discontinue the toasting operation.

It is desirable to be able to vary the toasting operation so that the slice will have a desired light or dark shade when the operation is automatically discontinued. This can be accomplished by adjusting the relay 48 to vary the time of closing of its contacts 49 and 50. The relay adjustment may comprise a cam 67 carried by a shaft 68 which is provided with a knob 69 accessible from the outside of the housing 10. The cam 67 forms a stop which is engaged by the arm 64 of the armature of the relay and which determines the spacing of the armature with respect to the relay core. The setting of the cam 67 thus determines the extent to which the relay 48 must be deenergized to permit the armature 63 to drop away from the core to cause closing of the contacts 49 and 50. If the cam 67 is set so that the air gap between the armature and the core is relatively wide, only a small decrease in the energization of the relay will be needed to permit closing of the relay contacts; but on the other hand if the air gap is small, a greater decrease in the energization of the relay must occur before the relay contacts can close. It will therefore be seen that by means of this adjusting cam 67 the functioning of the relay can be varied so that the toasting operation will be discontinued upon the occurrence of a predetermined change in the conductivity of the slice.

To facilitate the adjustment of the relay 48, I provide the knob 69 with a pointer 70 which cooperates with a color chart 71 mounted on the housing 10. The color chart displays toast shades which vary progressively between two extremes represented by the plain or uncolored section 72 and the section 73 representing the deepest or darkest color to which bread or the like can be toasted. In other words, the color chart 71 carries progressively deepening shades of brown starting with a brown tinged white and extending to a black or brown tinged black. The operator moves the knob 69 to locate the pointer at the actual color shade which he wants his toast to have. When the pointer is set at this shade, the relay adjustment will be such as to automatically cause the toasting operation to be discontinued when the slice has been toasted to the selected shade.

From the foregoing description and the accompanying drawings it will now be seen that I have provided novel means by which bread slices or the like can be toasted more satisfactorily than has heretofore been possible. It will also be seen that in my toasting device, a change in the moisture content and conductivity of the slice is used to automatically control the toasting operation and that novel adjusting means enables the operator to select in advance the color or shade which he wants his toast to have when the toasting operation is automatically discontinued.

While I have illustrated and described my improved toasting device in more or less detail, it will be understood, of course, that I do not wish to be limited to the particular steps and details of construction herein disclosed but regard my invention as including such changes and modifications as do not constitute a departure from the spirit of the invention and the scope of the appended claims.

Having thus described my invention, I claim:

1. In a toasting device, an electric element for heating a slice to be toasted, means for supplying current to said element, a relay having a core and an armature carrying one of a pair of cooperating relay contacts adapted to be closed when the energization of the relay decreases a predetermined amount, a circuit for the relay containing spaced pins adapted to be inserted into the slice so that the energization of the relay is dependent upon the electrical conductivity of the slice, means for adjusting the spacing of said armature and core for varying the effectiveness of the relay, and means controlled by the relay contacts for interrupting the supply of current to said element.

2. In a toasting device, an electric element for heating a slice to be toasted, a circuit for supplying current to said element and having a switch therein, a relay having cooperating contacts adapted to be closed when the energization of the relay decreases a predetermined amount, a circuit for the relay containing spaced pins adapted to be inserted into the slice so that the energization of the relay is dependent upon the electrical conductivity of the slice, spring biased means movable to disengage said slice from said pins, an electro-magnetic latch device for holding said spring biased means against such slice disengaging movement and adapted when energized to release said spring biased means, means for opening said switch during said slice disengaging movement, and a circuit for energizing said electro-magnetic latch device and controlled by the contacts of said relay.

3. In a toasting device, an electric element for heating a slice to be toasted, a circuit for supplying current to said element and having a switch therein, a relay having a core and an armature carrying one of a pair of cooperating relay contacts adapted to be closed when the energization of the relay decreases a predetermined amount, a circuit for the relay containing spaced pins adapted to be inserted into the slice so that the energization of the relay is dependent upon the electrical conductivity of the slice, means for adjusting the spacing of said armature and core for varying the effectiveness of the relay, spring biased means movable to disengage said slice from said pins, an electro-magnetic latch device for holding said spring biased means against such slice disengaging movement and adapted when energized to release such spring biased means, means for opening said switch during such slice disengaging movement, and a circuit for energizing said magnetic latch device and controlled by the contacts of said relay.

MARION W. HUMPHREYS.